United States Patent [19]

Karszes

[11] 3,891,788
[45] June 24, 1975

[54] ETHYLENE-VINYL CHLORIDE EMULSION COATED PLASTIC LAMINATE

[75] Inventor: William M. Karszes, Coshocton, Ohio

[73] Assignee: General Electric Company, Schenectady, N.Y.

[22] Filed: Dec. 13, 1973

[21] Appl. No.: 424,514

[52] U.S. Cl. .............. 428/511; 428/921; 428/537; 260/29.6 XA; 117/155 UA
[51] Int. Cl.² .......................................... B32B 27/10
[58] Field of Search .................. 161/247, 250, 270; 260/29.6 XA; 117/155 UA

[56] References Cited
UNITED STATES PATENTS

| 3,135,643 | 6/1964 | Michl | 161/258 X |
| 3,296,170 | 1/1967 | Burkhart et al. | 260/29.6 XA |
| 3,373,071 | 3/1968 | Fuerst | 161/258 X |
| 3,432,339 | 3/1969 | Howell et al. | 260/29.6 XA |
| 3,755,238 | 8/1973 | Wiita | 161/247 X |
| 3,769,151 | 10/1973 | Knutson et al. | 161/251 X |

*Primary Examiner*—George F. Lesmes
*Assistant Examiner*—Patricia C. Ives

[57] ABSTRACT

Ethylene vinyl chloride emulsion-containing material is used as a plastic laminate back coating to provide a surface which is readily adhered to substrates using a wide range of adhesives and without special treatment such as sanding or roughening.

6 Claims, No Drawings

3,891,788

ETHYLENE-VINYL CHLORIDE EMULSION COATED PLASTIC LAMINATE

This invention relates to plastic laminates which are prepared by laying up and consolidating under heat and pressure resin impregnated laminae. More particularly, it relates to such laminates which are possessed of good integrity or resistance to delamination as well as non-blocking characteristics during preparation along with an ability to be adhered to substrates or backing materials using a wide range of adhesives without first roughening the laminate surface to be adhered.

The novel relatively thick plastic laminates prepared from superimposed layers such as of paper or other sheets impregnated with thermosetting resins and consolidated under heat and pressure are well known. Generally speaking, such laminates consist of resin impregnated core layers which may have superimposed thereon a print paper for decorative purposes. In many cases the decorative or print layer is overlaid with a protective layer which is relatively transparent so that the print or design can be viewed. Typically, the core layers are of ordinary or creped kraft paper which can be impregnated with any of a number of resins. Preferred and most generally used is a condensation product of a phenol and an aldehyde and more particularly an alkali catalyzed phenol formaldehyde condensation product typified by Resinox 470 manufactured by the Monsanto Company. Generally speaking, the resin content of the core paper ranges from about 25 to 29 percent by weight for ordinary kraft paper and from about 34 to 37 percent by weight of resin for a normally used creped kraft paper. The print paper is usually impregnated with a thermosetting resin which is characterized by resistance to discoloring, resistance to wear and which also has translucent or transparent qualities. While any of a number of resins can also be used for this purpose, modified melamine formaldehyde reaction products are particularly useful in this respect. An example of such a melamine formaldehyde resin is Cymel 428 manufactured by the American Cyanamid Company. This resin is a white, free-flowing powder specifically designed for the purpose and is readily soluble in water or in alcohol-water solvents, giving a clear, colorless solution, stable at 50 percent solids content for at least two days at room temperature. When an overlay sheet or protective layer is used over the print sheet, it is generally of a high purity, highly translucent alpha cellulose paper, rayon paper and the like which is treated with the same resin as the print paper to a resin content of about 60 to 65 percent by weight. The resin impregnated core sheets are dried without substantially advancing the cure of the resin and laid up in the desired number, such core layup being overlaid with a dried resin impregnated print paper and overlay paper where desired. The whole is then cured in the usual manner as by placing between polished stainless steel panels at times varying from about 10 to 25 minutes at from about 130°C to 150°C at pressures ranging from 800 psi to 1500 psi, the laminates then being cooled, still under pressure, to below about 40°C and removed from the press. Abrasion resistant materials can be included in the overlay paper or in a resinous coating on the print paper or decorative surface which can, when desired, take the place of the overlay. The overlay can also be an unfilled resin film or layer.

There can also be prepared so-called thin plastic or coreless laminates prepared as above except that the phenolic impregnated core sheets or layers are eliminated, such thin laminates being possessed of a desirable degree of flexibility and handleability and resistance to abrasion, gouging, high temperatures and the like which are not possessed to as great a degree by the so-called low pressure laminates. The print sheet can be treated with the above mentioned melamine resin or other material or treated with the present ethylene vinyl chloride containing materials. These laminates can also have an overlay sheet as above or resin layer which may be treated with abrasion-resistant material or used as such.

While high pressure laminates prepared typically as above are useful for many purposes in and of themselves, they are normally in actual use applied to or adhered to a substrate or backer material such as plywood, particle board, chipboard, hardboard, metal, plastic foam and the like in which state they are used as desk tops, countertops, wall paneling, flooring and other purposes. While such laminates are readily adherable to the substrate or backer by means of so-called contact adhesives, such adhesives are relatively expensive. When using cheaper adhesives such as urea formaldehyde adhesives, white glues such as polyvinyl acetate, polyacrylic and polyethylene materials and copolymers thereof, phenolic or resorcinol formaldehyde adhesives and adhesives prepared from epoxy and other resins, asphalts, coal tars and animal glues, it is necessary to especially prepare or roughen the back of the laminates as by a sanding operation. This sanding which is necessary for the proper adhesion of the laminate using the less expensive adhesives is not only relatively expensive but in the case of the thinner laminates where relatively few core sheets or no core sheets at all are used, tends to unduly reduce the thickness of and weaken or even fracture the plastic laminate.

From the above it will be quite apparent that there is a need for high pressure laminates which can be cohered to backer materials with a wide range of adhesive materials without roughening or other such treatment of the laminate which tends to detract from its characteristics or which is unduly labor consuming. It is accordingly a primary object of the present invention to provide high pressure laminates which are readily adhered to backer materials using a wide range of adhesives.

It is a further object of the present invention to provide thin or coreless plastic laminates which are desirably flexible and are non-blocking and are also readily adhered to substrates using inexpensive adhesives.

Those features of the invention which are believed to be novel are set forth with particularity in the claims appended hereto. The invention will, however, be better understood and further objects and advantages appreciated from a consideration of the following description.

Briefly, according to the present invention, the back layer of the laminate to be adhered to a substrate is treated or coated with a coating material having an ethylene vinyl chloride emulsion base with optionally a pH adjuster, filler, thickening agent and other additives where desired. In practice, the coating material of the invention in the case of a coreless laminate is coated on the back side of the print paper which has been previously impregnated with a melamine resin such as that above or other material. Untreated print papers can also be used, such print papers being treated or coated and impregnated with the ethylene vinyl chloride material. The overlay paper, if one is used, is then superimposed on the print paper and the laminate consolidated under heat and pressure in the usual manner. When thicker laminates or those having core sheets are desired, the back core sheet besides being treated with the usual phenolic resin is coated with the present coating material on its back side, the entire laminate layup including print sheet and any overlay paper again being consolidated under heat and pressure. The ethylene vinyl chloride material can also be used as the sole treatment for the back core sheet. It will, of course, be realized that the overlay sheet can in both cored and coreless laminates be entirely eliminated or substituted by a resinous film or by a coating of resin which can contain an abrasion-resistant or other material including those described in U.S. Pat. Nos. 3,135,643 and 3,373,071. The present coating materials can also optionally contain other additives such as defoamers, filler dispersers, flame retardants, or other materials which facilitate coating.

The ethylene vinyl chloride materials of the present invention are of two kinds and are used in specific proportions to obtain a balance of characteristics including good nonblocking characteristics along with good adhesion-promoting properties. Typical of such materials are Monflex 4800 produced by Monsanto, this material being a water emulsion of ethylene vinyl chloride having carboxyl pendant groups, a molecular weight of about 40,000 to 50,000, a viscosity of 50 to 150 cp as measured on the Brookfield Rheometer and a glass transition temperature of 0°C. Another ethylene vinyl chloride latex material used is typified by Monflex 4530 also produced by Monsanto, this ethylene vinyl chloride having amide pendant groups, a molecular weight of 80,000 to 90,000, a Brookfield viscosity of 25 to 200 cp. and a glass transition temperature of 30°C.

Also useful are Monflex 4514, an ethylene vinyl chloride latex with amide pendant groups having a molecular weight of 60,000 to 70,000, a Brookfield viscosity of 200 to 500 cp. and a glass transition temperature of 14°C. Monflex 4500 is similar to Monflex 4514 except that it has a molecular weight of 40,000 to 50,000, a Brookfield viscosity of 50 to 150 cp. and a glass transition temperature of 0°C. Monflex 4814 is similar to Monflex 4800 except that it has a molecular weight of 60,000 to 70,000, a Brookfield viscosity of 200 to 500 cp. and a glass transition temperature of 14°C.

It has been found that the higher the concentration of Monflex 4530, the lower the tendency of the dried material to block. However, at the same time, the cohering or adhering quality of the surface is lowered when adhered with the usual range of adhesives. It has been found that from overall practice and considerations such as the anti-blocking characteristic and adhesion qualities, from about 55 percent to 80 percent by weight of Monflex 4800 is desirable along with from 45 percent to 20 percent of Monflex 4530. The best overall characteristics are achieved using 70 percent by weight Monflex 4800 and 30 percent Monflex 4530. A part or all of the Monflex 4800 can be substituted by Monflex 4814. A part of the Monflex 4800 can be substituted with Monflex 4500. Similarly, a part of all of the Monflex 4500 can be substituted with Monflex 4514.

It has been found desirable from the point of view of increased adhesion capability to adjust the pH of the ethylene vinyl chloride emulsion to a level of from about 5.0 to 6.0. While it is not desired to be held to any particular theory as to such increased adhesion with pH control, it is believed that the effect of such pH adjustment is to change the equilibrium of the carboxyl groups to provide a more highly hydrogen bonded film. While acetic acid has been found to be a conveniently preferred pH adjuster, any mineral or organic acid can be used in this role including, among others, hydrochloric acid and benzoic acid.

In order to facilitate the handling or processing of the coating material as well as to extend the emulsion, finely divided fillers can be used in proportions ranging from about 10 percent to 40 percent by weight, based on the dry ethylene vinyl chloride polymer, the preferred filler level being 20 percent by weight. Any of a number of such fillers can be used including fumed silica, such as Cab-O-Sil, Glidden G-100 silica, Engelhard Sanitone S and Georgia Kaolin Company Andrite-R, Glomax-LL, and Kaopaque-20 materials. The Engelhard Sanitone and Georgia Kaolin Company materials are clays of various particle shapes, size and pretreatments. Finely divided calcium carbonate can be used as well as other finely divided non-reactive fillers. Conveniently used is Engelhard ASP-400 clay. When the finely divided silicas are used, they are preferably used in amounts of from about 1 to 5 percent, by weight, as opposed to from about 10 to 40 percent by weight for the clayey and other finely divided materials.

In some cases it is desirable to use a thickening agent to increase or adjust the viscosity of the coating for processing and coating convenience, such thickening agent acting as well as a binder for the clay or other filler. American Cyanamid P-26 modified polyacrylamide resin having a molecular weight of about 200,000 and minority carboxyl content can conveniently be used in this role at from about 0.2 to 1 percent by weight with a preferred level of 0.25 percent. Also useful in this role is sodium alginate, polyethylene oxide, polyvinyl alcohol, polyacrylate, toluene and carboxy methyl cellulose, such materials being well known to those skilled in the art.

In some cases it may be desirable to use a defoaming agent. Typical of such agents are Nopco Foamaster VL, a polyoxyethylene polymer terminated with ester groups, used in proportions up to about five parts per million, or isopropanol in amounts of from about 1 to 2 percent, or other such agents which will occur to those skilled in the art. In some cases it may be desirable to use a dispersant for the filler, a small amount of sodium citrate or other filler material used in proportions of about 0.3 percent of the filler weight being useful in this respect, along with other dispersants such as tetrasodium pyrophosphate.

In order to meet flame retardant or resistant requirements, any of the usual flame retardants can be used including, typically, antimony oxide which can be used in proportions from about 2 to 15 percent, or sodium borate products such as U.S. Borax Firebrake ZB being used in proportions typically of from about 1 to 20 percent based on the dry polymer weight.

Process aids can also be used in the coating material. Typical of such materials are hexylene glycol which can be used as a leveling agent in effective amounts.

The ingredients including the emulsion, filler and thickening agent along with any other desired ingredients are thoroughly blended into a homogeneous mixture which is then coated in any convenient manner onto the print paper or back core sheet which is to be adhered or used to impregnate these layers. In the case of coreless laminates, the coated print sheet along with any overlay sheet or coating or film is laid up and consolidated under heat and pressure as described above. In the case of laminates containing core sheets, the layup is assembled and treated under heat and pressure with the coated core sheet surface at the back or outward.

The following examples illustrate the practice of the present invention, it being realized that they are to be taken as exemplary only and not limiting in any way. All proportions are by weight unless otherwise indicated.

EXAMPLE 1

There were thoroughly mixed together into a homogeneous mixture 70 percent Monflex 4800 and 30 percent Monflex 4530, there being included in the mixture 20 percent by weight, based on the weight of the dry polymer, of ASP-400 clay as a filler extender and processing aid, along with 0.25 percent based on the dry polymer weight of P-26 polyacrylamide as a thickening agent which increases the viscosity and also serves as a binder for the filler. The pH of the mixture was adjusted to 5.5 using acetic acid. Also included were three parts per million of Foamaster VL as a defoamer and 0.3 percent of sodium citrate dispersant agent, the dispersant amount being based on the weight of the filler. A print paper was saturated with Monflex 4800, it being realized that any of the present ethylene vinyl chloride materials can be used in this role. There was then superimposed on the front side of the print sheet a melamine resin treated alpha cellulose overlay paper, the layup being consolidated for 12 to 15 minutes at 1000 psi at a temperature of 135°C to 140°C to form a thin, high pressure laminate. The example was repeated in this, as in every other example, by laying up a cored laminate consisting of overlay paper, print sheet and six backer sheets of kraft paper saturated to a resin content of about thirty percent by weight with the above phenolic resin, the free side of the outer or back cored sheet being treated as in the case of the print sheet above with the present coating composition, the whole being laid up into a plastic laminate under heat and pressure as previously described. It was found that coreless and cored laminates so prepared were readily adherable to substrates such as fiberboard, chipboard, plywood and the like using cold setting adhesives such as white glues, urea formaldehyde as well as hot melt adhesives without first roughening or sanding the adhering surface of the laminate. The coreless or thin laminates so prepared were found to be flexible and capable of being wound up into rolls without cracking or failure. Furthermore, it was found that such thin laminates did not block or adhere from layer to layer.

EXAMPLE 2

Example 1 was repeated except that the percent of Monflex 4530 was sixty and the percent of Monflex 4800 was forty. Thin laminates prepared using this coating composition were possessed of undesirably decreased adhesion using adhesives such as those above.

EXAMPLE 3

Example 1 was repeated except that Monflex 4814 was used in place of Monflex 4530. It was found that the adhesive capability of laminates so prepared actually increased somewhat with the flexibility of the thin laminates remaining about the same. However, thin laminates so prepared tend to block more readily when rolled up so that special non-adhering interlayers were necessary.

EXAMPLE 4

When Example 1 was repeated using Monflex 4500 in place of Monflex 4530, the adhesive qualities of the laminates so prepared decreased somewhat with the flexibility remaining the same. Once again a decrease in the anti-blocking characteristic necessitated the use of nonblocking interlayers.

EXAMPLE 5

Example 1 was repeated using Monflex 4514 in place of Monflex 4530. Laminates so prepared were possessed of adhesive and flexibility qualities equivalent to those of Example 1 with a slight decrease in antiblocking characteristic of the rolled thin laminate.

The following examples of Table I illustrate the effect of various fillers used in connection with the present invention. In each case the adhesion flexibility and antiblock characteristics are compared with respect to the laminates of Example 1.

TABLE I

| Ex. | Basic Latex Variation<br>Variation in Basic Coating Formulation | Adhesion | Flexibility | Antiblock Characteristic |
|---|---|---|---|---|
| 2 | Increase ratio of 4530 to 4800 | Decreases | Remains constant | Increases |
| 3 | Monflex 4814 in place of 4530 | Increases | Constant | Decreases slightly |
| 4 | Monflex 4500 in place of 4530 | Constant | Constant | Decreases |
| 5 | Monflex 4514 in place of 4530 | Constant | Constant | Decreases slightly |
| 6 | Fumed silica (1–5%) Cab-O-Sil | Increases | Constant | Constant |
| 7 | Silica (1–5%) Glidden G-100 | Increases | Constant | Increases slightly |

TABLE I — Continued

Basic Latex Variation

| Ex. | Variation in Basic Coating Formulation | Adhesion | Flexibility | Antiblock Characteristic |
|---|---|---|---|---|
| 8 | Sanitone S (Engelhard) | Constant | Constant | Constant |
| 9 | Ardrite-R | Constant | Constant | Constant |
| 10 | Glomax-LL } 10–40% | Constant | Constant | Constant |
| 11 | Kaopaque-20 | | | |
| 12 | Calcium carbonate (10–40%) | Constant | Constant | Decreases slightly |

The following examples show the effect of substituting other thickeners for those of Example 1, the comparison again being with respect to the characteristics of the laminates of Example 1.

TABLE II

Thickeners

| Ex. | Variation in Basic Coating Formulation | Adhesion | Flexibility | Antiblock Characteristics |
|---|---|---|---|---|
| 13 | Polyvinyl alcohol | Constant | Constant | Constant |
| 14 | Polyacrylate | Constant | Constant | Constant |
| 15 | Carboxy Methyl Cellulose | Constant | Constant | Constant |

The following examples of Table III show the effect of substituting various other clay dispersants for that of Example 1.

TABLE III

Dispersants

| Ex. | Variation in Basic Coating Formulation | Adhesion | Flexibility | Antiblock Characteristics |
|---|---|---|---|---|
| 16 | Tetrasodium pyrophosphate | Constant | Constant | Constant |
| 17 | Sodium citrate | Constant | Constant | Constant |
| 18 | Sodium silicate | Constant | Constant | Constant |

The following examples show the effect of using pH adjusters other than the acetic acid of Example 1, it being shown that there is no effect upon the critical characteristics of the laminates.

TABLE IV

Adjusters

| Ex. | Variation in Basic Coating Formulation | Adhesion | Flexibility | Antiblock Characteristics |
|---|---|---|---|---|
| 19 | Hydrochloric acid | Constant | Constant | Constant |
| 20 | Benzoic acid | Constant | Constant | Constant |

The examples of Table V below show the effect of using various types of defoamers.

TABLE V

Defoamers

| Ex. | Variations in Basic Coating Formulation | Adhesion | Flexibility | Antiblock Characteristic |
|---|---|---|---|---|
| 21 | Foamaster VL (3 ppm) | Constant | Constant | Constant |
| 22 | Isopropanol (1–2%) | Constant | Constant | Constant |

The Examples of Table VI below show the comparative effect with respect to the products of Example 1 of the use of various flame retardants.

TABLE VI

Flame Retardants

| Ex. | Variations in Basic Coating Formulation | Adhesion | Flexibility | Antiblock Characteristic |
|---|---|---|---|---|
| 23 | Firebrake ZB (1–20%) Sodium borate product | Constant | Constant | Constant |
| 24 | Antimony Oxide (2–15%) | Constant | Constant | Constant |

Other additives which do not adversely affect the flexibility, adhesion and antiblocking characteristics can be used.

There are provided, then, by the present invention thin or coreless plastic laminates as well as the usual cored plastic laminates which are capable of being adhered to various substrates without the sanding or roughening necessary with usual laminates using a wide variety of readily available and economical adhesives. The thin laminates are particularly characterized by flexibility which makes them readily conformable to surfaces of various shapes, such thin laminates being further characterized by their ability to be stored in roll form as such and without special interlayers without blocking.

What I claim as new and desire to secure by Letters Patent of the United States is:

1. A plastic laminate comprising at least one resin impregnated paper sheet and wherein there is enhanced adhesion with adhesives to substrates without roughening, said laminate having at least on its adhering surface a coating comprising polymerized ethylene vinyl chloride emulsion emplaced before heat and pressure consolidation of the laminate, said ethylene vinyl chloride polymer emulsion comprising a blend of, by weight, from about 55 to 80 percent of ethylene vinyl chloride having carboxyl pendant groups and from about 45 to 20 percent of ethylene vinyl chloride polymer having amide pendant groups.

2. A plastic laminate as in claim 1 in which said emulsion additionally contains a filler.

3. A plastic laminate as in claim 1 in which said coating contains a thickener.

4. A plastic laminate as in claim 1, said laminate comprising a plurality of paper core sheets, the substrate adhering core sheet being impregnated with said ethylene vinyl chloride emulsion.

5. A plastic laminate as in claim 1, said laminate comprising a paper print sheet impregnated with said ethylene vinyl chloride emulsion, said print sheet having an overlying protective surface on its non-adhering side.

6. A plastic laminate as in claim 1 wherein the pH of said ethylene vinyl chloride emulsion is from about 5.0 to 6.0.

* * * * *

UNITED STATES PATENT OFFICE
CERTIFICATE OF CORRECTION

PATENT NO. 3,891,788

DATED June 24, 1975

INVENTOR(S) William M. Karszes

It is certified that error appears in the above—identified patent and that said Letters Patent are hereby corrected as shown below:

Column 9, line 10, delete "polymer"

line 11, after "chloride" insert - polymer -

Signed and Sealed this twenty-sixth Day of August 1975

[SEAL]

Attest:

RUTH C. MASON
Attesting Officer

C. MARSHALL DANN
Commissioner of Patents and Trademarks